(12) United States Patent
Emblem

(10) Patent No.: US 11,751,543 B2
(45) Date of Patent: Sep. 12, 2023

(54) FISH FARM AND METHOD FOR OPERATION

(71) Applicant: SØLVPILEN AS, Alesund (NO)

(72) Inventor: Knut-Arild Emblem, Alesund (NO)

(73) Assignee: SØLVPILEN AS

(*) Notice: Subject to any disclaimer, the term of this patent is extended or adjusted under 35 U.S.C. 154(b) by 0 days.

(21) Appl. No.: 16/954,502

(22) PCT Filed: Sep. 14, 2018

(86) PCT No.: PCT/NO2018/050230
§ 371 (c)(1),
(2) Date: Jun. 16, 2020

(87) PCT Pub. No.: WO2019/125175
PCT Pub. Date: Jun. 27, 2019

(65) Prior Publication Data
US 2021/0084871 A1 Mar. 25, 2021

(30) Foreign Application Priority Data
Dec. 20, 2017 (NO) .................................. 20172021

(51) Int. Cl.
*A01K 61/10* (2017.01)
*A01K 63/04* (2006.01)
(52) U.S. Cl.
CPC ............ *A01K 61/10* (2017.01); *A01K 63/047* (2013.01); *A01K 2227/40* (2013.01)
(58) Field of Classification Search
CPC ...... A01K 61/10; A01K 63/047; A01K 63/04; A01K 61/00; A01K 7/02
See application file for complete search history.

(56) References Cited

U.S. PATENT DOCUMENTS

| 3,198,171 A | 8/1965 | Westphal |
| 3,888,210 A | 6/1975 | Buss |
(Continued)

FOREIGN PATENT DOCUMENTS

| CN | 203399619 | 1/2014 |
| CN | 103766269 | 5/2014 |
(Continued)

OTHER PUBLICATIONS

International Search Report and Written Opinion dated Apr. 1, 2019 in PCT Application No. PCT/NO2018/050230.
(Continued)

*Primary Examiner* — Kathleen I Alker
*Assistant Examiner* — Carly W. Lynch
(74) *Attorney, Agent, or Firm* — Snell & Wilmer L.L.P.

(57) ABSTRACT

A fish farm having a land-based fish tank (1a-e) and a water supply system (100) with a supply line (2C,D) and a discharge line (2A,B) fluidly connected to a water reservoir (3); a fluid intermediate storage (5,6, 56); a circulation conduit (9a-f) fluidly connected to the fish tank (1a-e); a valve arrangement (10a-p) fluidly connected to the supply line (2C,D), the discharge line (2A,B), the fluid intermediate storage (5,6, 56) and the circulation conduit (9a-f), the valve arrangement (10a-p) having first and second operational configurations for circulation of fluid between the fluid intermediate storage (5,6, 56) and the tank (1a-e) via the circulation conduit (9a-f) and for circulation of fluid between the fluid intermediate storage (5,6, 56) and the reservoir (3) via the supply and discharge lines (2A-D). There is also provided a method for operating a fish farm having at least one land-based fish tank.

17 Claims, 5 Drawing Sheets

(56) References Cited

U.S. PATENT DOCUMENTS

| | | | |
|---|---|---|---|
| 2013/0186347 A1* | 7/2013 | Stephens | A01G 33/00 |
| | | | 119/260 |
| 2017/0105393 A1* | 4/2017 | Plante | A01K 63/042 |
| 2017/0325427 A1 | 11/2017 | Straight et al. | |

FOREIGN PATENT DOCUMENTS

| | | | | |
|---|---|---|---|---|
| CN | 103766269 A | * | 5/2014 | A01K 63/003 |
| CN | 204550208 | | 8/2015 | |
| CN | 204670143 | | 9/2015 | |
| CN | 204670146 | | 9/2015 | |
| CN | 205390024 | | 7/2016 | |
| CN | 206728929 | | 12/2017 | |
| EP | 1185168 | | 5/2004 | |
| JP | 2019513420 | | 5/2019 | |
| KR | 101362435 | | 11/2013 | |
| KR | 101362435 | | 2/2014 | |
| KR | 101362435 B1 | * | 2/2014 | A01K 63/04 |
| WO | 2006093183 | | 9/2006 | |
| WO | WO-2006093183 A1 | * | 9/2006 | A01K 63/04 |
| WO | 2011084028 | | 7/2011 | |
| WO | 2017176125 | | 10/2017 | |
| WO | WO-2017176125 A1 | * | 10/2017 | A01K 63/003 |

OTHER PUBLICATIONS

Search Report dated May 3, 2018 in Norway Patent Application No. 20172021.
Office Action dated Jun. 10, 2021 in Chile Application No. 01229-2020.
Office Action dated Jul. 29, 2022 in Japanese Patent Application No. 2020-532055.

* cited by examiner

FISH FARM AND METHOD FOR OPERATION

CROSS REFERENCE TO RELATED APPLICATIONS

This application is a U.S. national stage entry under 35 U.S.C. § 371 of International Application No. PCT/NO2018/050230 filed Sep. 14, 2018 entitled "FISH FARM AND METHOD FOR OPERATION," which claims priority to, and the benefit of, Norway Patent Application Serial No. 20172021, filed on Dec. 20, 2017. Each of the foregoing applications are hereby incorporated by reference in their entirety (except for any subject matter disclaimers or disavowals, and except to the extent of any conflict with the disclosure of the present application, in which case the disclosure of the present application shall control).

The present invention relates to a fish farm and a method for operating a fish farm, particularly a fish farm suitable for land-based farming of fish.

BACKGROUND

The fish farming industry has been growing continuously over the last several years, and forms a significant part of the economy in many countries, such as Norway. With growing production volumes, issues such as pollution, fish welfare, and the environmental impact of the industry remain in focus, both among operators, regulatory bodies, and environmentalists. In addition, there is a continuous need for more efficient production systems and methods, to minimize energy consumption and otherwise optimize production.

Documents useful for understanding the background include CN 203399619 U, US 2017325427 A, EP 1185168 B1, CN 204670146 U and U.S. Pat. No. 3,888,210 A.

The present invention has the objective to provide systems and methods for fish farms which provide advantages, or at least alternatives, to conventional techniques.

SUMMARY

In an embodiment, there is provided a fish farm having at least one land-based fish tank and a water supply system, the water supply system comprising: a supply line and a discharge line, the supply and discharge lines being fluidly connected to a water reservoir; a fluid intermediate storage; a circulation conduit fluidly connected to the at least one fish tank; and a valve arrangement fluidly connected to the supply line, the discharge line, the fluid intermediate storage and the circulation conduit, the valve arrangement having: a first operational configuration in which the valve arrangement permits circulation of fluid between the fluid intermediate storage and the at least one tank via the circulation conduit while preventing fluid flow between the intermediate storage and the supply and discharge lines, and a second operational configuration in which the valve arrangement permits circulation of fluid between the fluid intermediate storage and the reservoir via the supply and discharge lines while preventing fluid flow between the intermediate storage and the circulation conduit.

In an embodiment, there is provided a method for operating a fish farm having at least one land-based fish tank, the method comprising the steps: (i) bringing an intermediate fluid storage into fluid communication with a water reservoir and circulating water from the water reservoir, through the intermediate fluid storage and to the water reservoir while preventing fluid flow between the intermediate fluid storage and the fish tank, and (ii) bringing the intermediate fluid storage into fluid communication with the at least one land-based fish tank and circulating water between the intermediate fluid storage and the fish tank while preventing fluid flow between the intermediate storage and the reservoir, wherein steps (i) and (ii) are carried out as separate, sequential steps.

In an embodiment, there is provided a fish farm with at least one land-based fish tank located at an elevated location compared to a reservoir, the fish farm having a water supply system comprising: a supply line and a discharge line, the supply and discharge lines being fluidly connected to a water reservoir and to the fish tank; a pump arranged in the supply line; a turbine arranged in the discharge line; and a coupling connecting the pump and the turbine, whereby the turbine is configured to generate power from a water flow in the discharge line and to supply the power to the pump via the coupling.

BRIEF DESCRIPTION OF THE DRAWINGS

Various characteristics will become clear from the following description of illustrative embodiments, given as non-restrictive examples, with reference to the attached drawings, in which.

DETAILED DESCRIPTION

Land-based fish farms are known and commonly used for hatcheries and farming of juvenile fish (e.g. salmon smolt), before the fish is transferred to sea pens. For certain types of fish, and in many regions, fish can be farmed in land-based farms for their entire life cycle, and recently there has also been an increased focus on using land-based farms for fish which have traditionally been farmed in sea-based farms. An example of this is the use of land-based farms for post-smolt and even for regular (full production cycle) salmon farming.

Such land-based farms usually comprise a number of fish tanks and a water supply system to provide replacement water for the tanks. The water supply system can be coupled to a reservoir or supply which is a freshwater source, a sea water source, or both. For fish welfare purposes, and for optimising production, it is necessary to have a minimum flow rate of water to replace the water in the tanks. This requires energy, and it is desirable to minimise such energy usage in order to minimise energy costs, while at the same time ensuring that the environmental conditions in the fish tanks remain acceptable.

Figure 1:
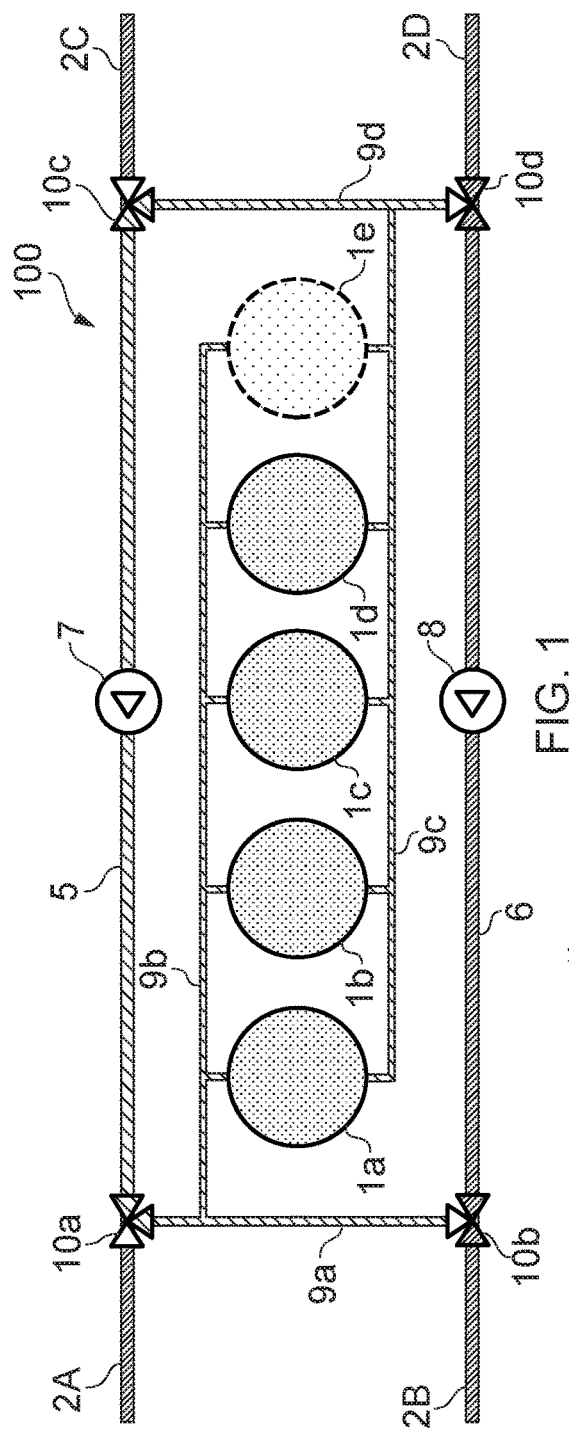
FIG. 1 is a schematic top view of a fish farm according to an embodiment in a first operational state.
Figure 2:
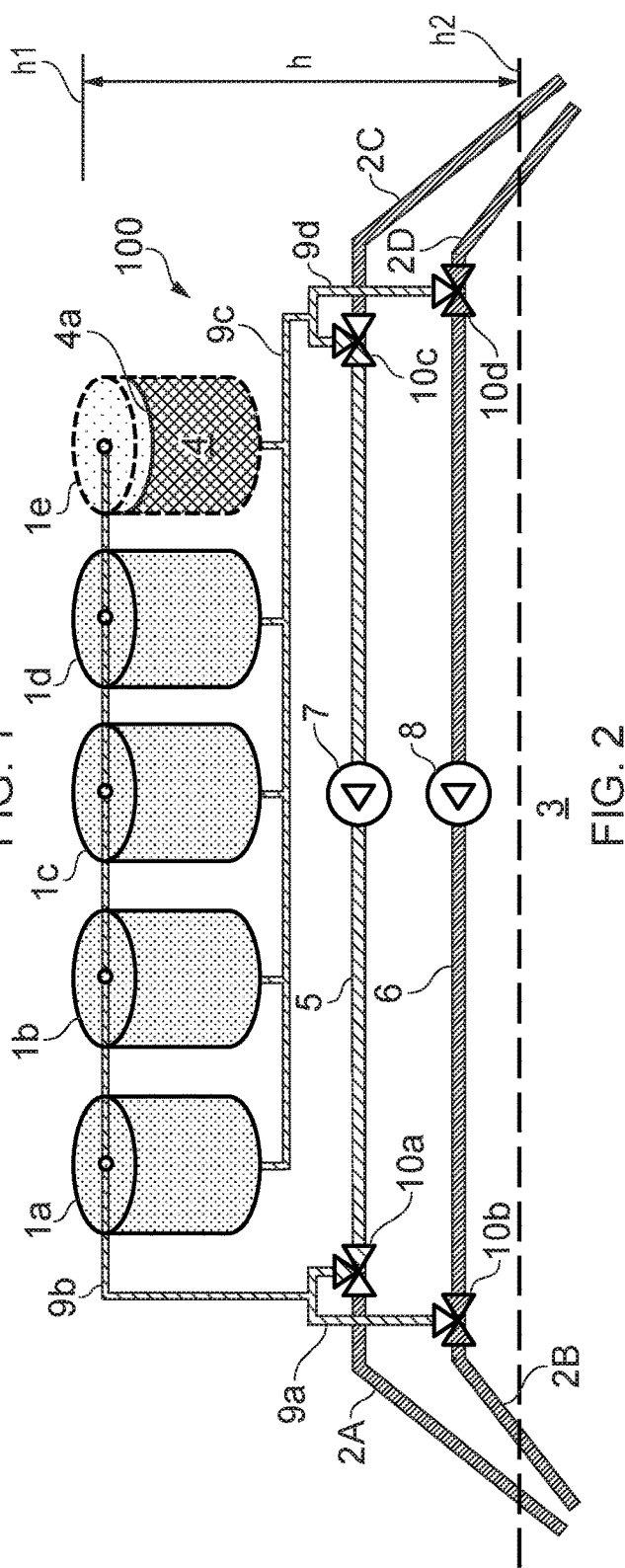
FIG. 2 is a schematic perspective view of the fish farm shown in FIG. 1.

In an embodiment according to the present invention, illustrated in FIGS. 1 and 2, there is provided a fish farm having at least one land-based fish tank 1a-e and a water supply system 100. The water supply system 100 comprises supply lines 2C,D and discharge lines 2A,B, the supply and discharge lines 2A-D being fluidly connected to a water reservoir 3 and adapted to provide water for replacing a part of the water in the fish tanks 1a-e. A part of the water in the fish tanks 1a-e is removed, typically through the bottom of the fish tank 1a-e, however discharge water can also, for example, be collected through a side outlet of the fish tank 1a-e. The supply lines 2C,D are in this embodiment shown as two separate lines, however may also be a single line or they may be fluidly connected downstream the section of the supply lines 2C,D shown in FIGS. 1 and 2. Similarly, the discharge lines 2A,B may be formed by a single line or fluidly connected.

Each fish tank 1a-e is filled with water 4, as illustrated in relation to tank 1e in FIG. 2, to a level 4a, which forms the upper water surface of the tank. The water 4 can be sea water, fresh water, or a mixture thereof, according to the type of fish farmed and the production requirements. Generally, the upper water surface 4a is the same in all the tanks 1a-e, however this does not necessarily have to be the case and different water levels can be used in different tanks, for example to adjust for the amount of biomass in the tank or for special purposes such as medical treatment.

The water reservoir 3 can be located lower than the upper water surface 4a in the fish tanks 1a-e, or lower than the fish tanks 1a-e altogether. The water reservoir 3 can be a common supply and discharge reservoir 3, for example, as is the case in the embodiment shown in FIGS. 1 and 2, the sea. Both the supply and discharge lines 2A-D then proceed into the sea to allow for collection of sea water into the supply lines 2C,D and for discharge from the discharge lines 2A,B. Alternatively, the water reservoir 3 can comprise separate supply and discharge reservoirs, such as water tanks. These may, for example, be water tanks located near the fish tanks 1a-e, or be distal to the fish tanks 1a-e but connected by pipelines. It may, for example, be desirable to provide a discharge tank for treatment of discharge water from the fish tanks 1a-e, for example to remove particulate matter and/or waste present in the discharge water.

The water supply system 100 also comprises a fluid intermediate storage 5,6. The intermediate storage 5,6 is configured to hold a volume of water, and may be any type of container or structure suitable for that purpose, for example a pipe, a fluid tank, or a combination of the two. In FIGS. 1 and 2, the intermediate storage 5,6 is shown merely as pipes 5,6. In this embodiment, the intermediate storage 5,6 comprises a first fluid pipe 5 and a second fluid pipe 6, arranged in a parallel setup which will be described in further detail below. The intermediate storage 5,6 can also be a tank similar to the fish tanks 1a-e, forming a buffer storage for water.

The intermediate storage 5,6 can be arranged higher than the fish tanks 1a-e, at the same height as the fish tanks 1a-e or lower than the fish tanks 1a-e.

Advantageously, the intermediate storage 5,6 is arranged at the same height as the fish tanks 1a-e or at a height which is between the fish tanks 1a-e and the reservoir 3. However the intermediate storage 5,6 may be located at a different height, for example if the reservoir 3 is the sea, the intermediate storage 5,6 may be arranged partly or fully in the sea, or just above sea level.

The water supply system 100 further comprises a circulation conduit 9a-d fluidly connected to the fish tanks 1a-e and valves 10a-d fluidly connecting the supply and discharge lines 2A-D to the intermediate storage 5,6, and the circulation conduit 9a-d to the intermediate storage 5,6. In the embodiment shown, the valves 10a-d are illustrated as four three-way valves, with three-way valves 10a,b fluidly connected to the discharge lines 2A,B, the intermediate storage 5,6 and the circulation conduit 9a-d, and three-way valves 10c,d fluidly connected to the supply lines 2C,D, the intermediate storage 5,6 and the circulation conduit 9a-d. However, the valve function shown here, and described in further detail below, can be realised in many different ways, and the invention is not intended to be limited to any particular valve arrangement. For example, it can be possible to use a set of individual, standard valves to realise the same functionality, or use one or more larger valve blocks with several conduits and closure elements arranged within the same unit. Alternatively, the system and method may be realised without valves, by manually exchanging and connecting/disconnecting the relevant fluid conduits and lines.

The valves 10a-d have first operational configuration in which the valves 10a-d permit fluid flow between the fluid intermediate storage 5,6 and the circulation conduit 9a-d and prevent fluid flow between the intermediate storage 5,6 and the supply and discharge lines 2A-D, and a second operational configuration in which the valves 10a-d permit fluid flow between the intermediate storage 5,6 and the supply and discharge lines 2A-D, and prevent fluid flow between the intermediate storage 5,6 and the circulation conduit 9a-d.

The water supply system 100 also comprises pumps 7,8 operable to flow water between the intermediate storage 5,6 and the circulation conduit 9a-d, and between the supply line 2C,D, via the intermediate storage 5,6, to the discharge line 2A,B. In the embodiment shown in FIGS. 1 and 2, the pumps 7,8 are located in the intermediate storage 5,6, whereby the pumps 7,8 can carry out both the above functions. Alternatively, the pumps 7,8 may be arranged elsewhere in the water supply system 100. For example, there may be a first pump arranged in the supply lines 2C,D, the discharge lines 2A,B or the fluid intermediate storage 5,6, and a second pump arranged in the circulation conduit 9a-d. Any pump configuration which is capable of providing water circulation between the intermediate storage 5,6 and the fish tanks 1a-e via the circulation conduit 9a-d, and between the reservoir 3 and the intermediate storage 5,6 via the supply and discharge lines 2A-D, can be used.

In use, the water supply system 100 enables circulation of water to/from one or more of the fish tanks 1a-e from the reservoir 3. (Each tank 1a-e may have additional valves or throttle elements to regulate the water flow into or out of the respective tank.) The circulation is carried out sequentially, wherein in a first part of the sequence, water is circulated from the reservoir 3 to the intermediate storage 5,6. In this part, the fluid connection between the intermediate storage 5,6 and the circulation conduit 9a-d (and thus also the fish tanks 1a-e) is closed. By means of the pump(s) 7,8, the intermediate storage 5,6 will be filled with fresh water from the reservoir 3 via the supply lines 2C,D, whereas discharge water present in the intermediate storage 5,6 (described below) will be removed through the discharge line 2A,B.

In the second part of the sequence, the fluid connection between the supply and discharge lines 2A-D and the intermediate storage 5,6 is closed, and the connection between the intermediate storage 5,6 and the circulation conduit 9a-d (and thus also the fish tanks 1a-e) is opened. The pump(s) 7,8 are operated to circulate the water in the intermediate storage 5,6 into the fish tanks 1a-e via the circulation conduit 9a-d, while discharge water from the fish tanks 1a-e will, at the same time, be circulated into the intermediate storage 5,6. Fresh water has thus been provided to the fish tanks 1a-e, while the discharge water now present in the intermediate storage 5,6 can be disposed of by repeating the first part of the sequence (see the previous paragraph).

In the embodiment shown in FIGS. 1 and 2, the intermediate storage 5,6 comprises a first fluid pipe 5 and a second fluid pipe 6, arranged substantially in parallel. The valve arrangement 10*a-d* is operable to operate the two parallel paths simultaneously, such that one side carries out the circulation to the fish tanks 1*a-e*, and the other carries out the circulation with the reservoir 3. Hence, one can achieve a near-continuous operation and circulation to the tanks 1*a-e* if that is desirable or required, even though each path operates sequentially as described above.

Figure 3:
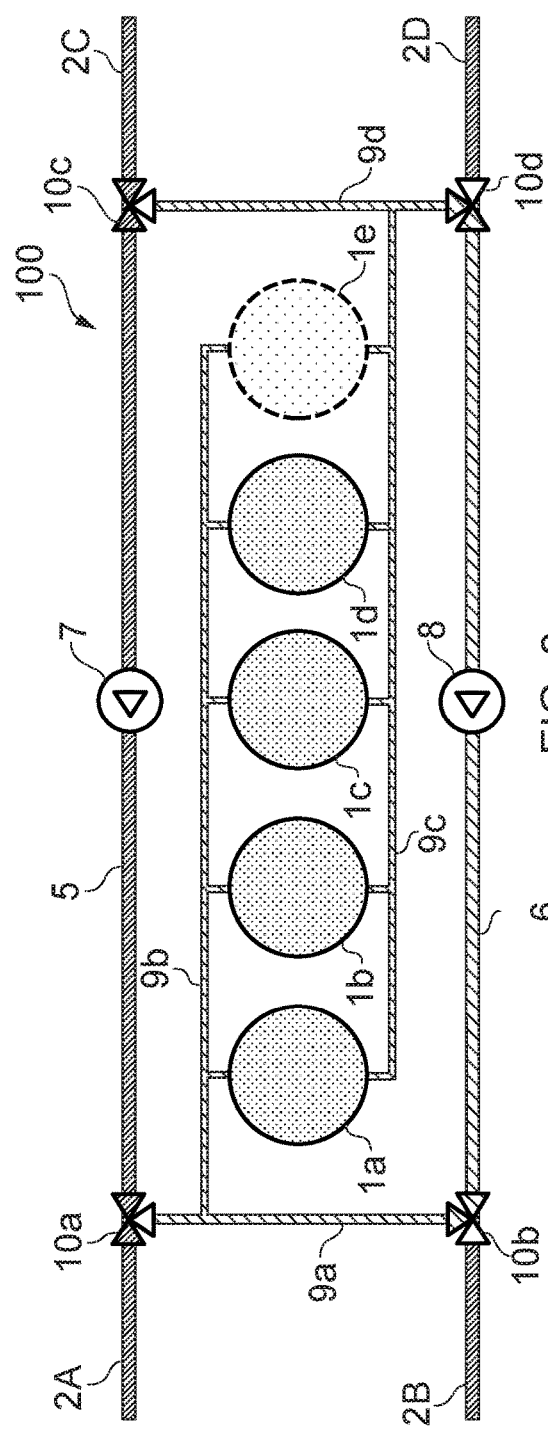
FIG. 3 is schematic top view of the fish farm in a second operational state.
Figure 4:
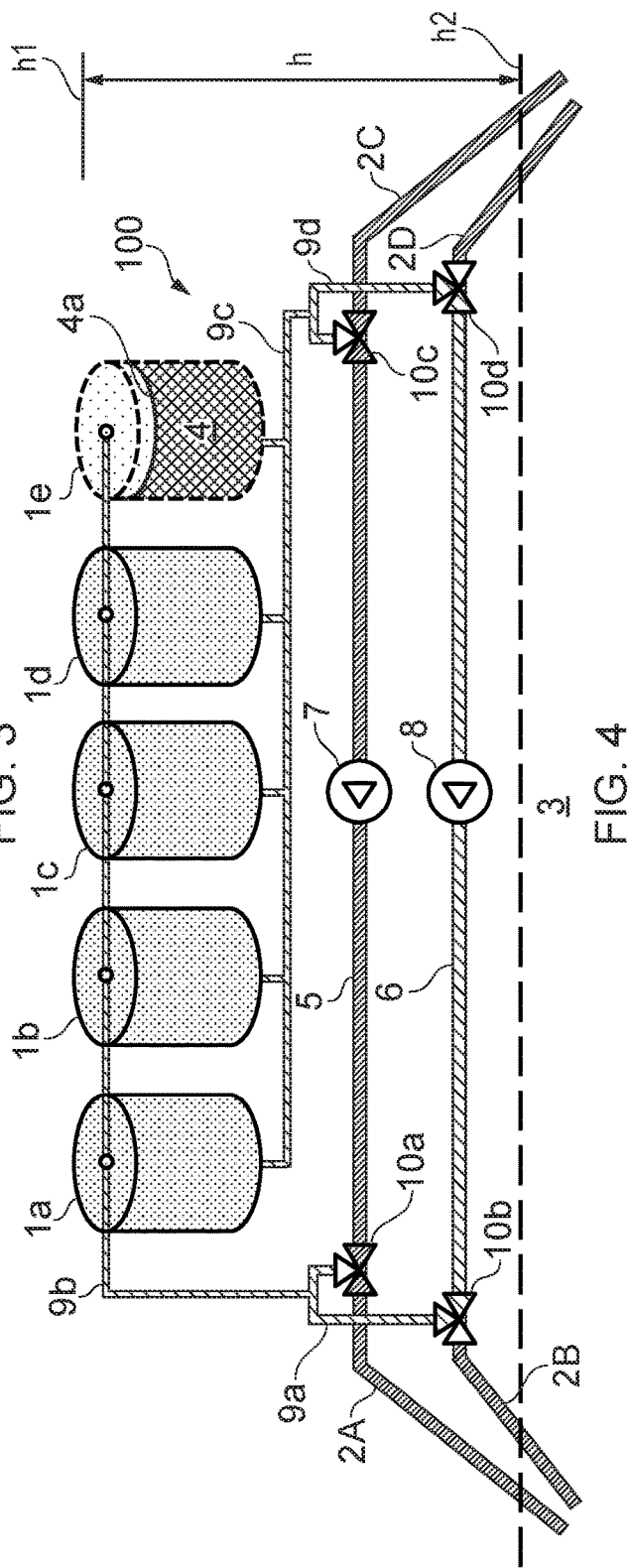
FIG. 4 is a schematic perspective view of the fish farm shown in FIG. 3.

These different parts of the sequence are illustrated in more detail in FIGS. 1-4. In FIGS. 1 and 2, the valves 10*a* and 10*c* open so that the pipe 5 can circulate to the fish tanks 1*a-e*, while the valves 10*b* and 10*d* open so that pipe 6 can circulate to the reservoir 3. In FIGS. 3 and 4, this is switched, so that pipe 5 circulates to the reservoir 3 and pipe 6 to the tanks 1*a-e*. In this way, a near-continuous circulation of fresh water to the fish tanks 1*a-e* can be achieved. It is, however, possible to use only a single intermediate storage 5,6 volume so that circulation to the fish tanks 1*a-e* occurs intermittently. This depends on the requirements in any given case, e.g. the required rate of supply of fresh water to the tanks 1*a-e*.

In an alternative embodiment, the pumps 7,8 can be omitted and circulation in the system can be provided with natural flow utilising temperature and density differences of the water. Optionally, there may be pumps provided for only one of the circulation paths, e.g. whereby the circulation from the reservoir 3 to the intermediate storage 5,6 is carried out by natural flow while circulation between the intermediate storage 5,6 and the tanks 1*a-d* is carried out by means of pumps.

Circulation using natural flow can for example be achieved if there are temperature differences of the water in the different parts of the flow paths. As water is generally heaviest (i.e. has highest density) at approximately 4 degree Celcius (degC), one may for example collect water which is colder than this from a sea reservoir 3. As the water may be heated somewhat during the process (e.g. by means of heat from the farmed fish or heat exchange with the fish farm components), the water flowing out through discharge lines 2A,2B will be denser than the water flowing into supply lines 2C,2D, whereby a gravity-based natural flow occurs. The same effect can be achieved, for example, by arranging a heat exchanger in the discharge lines 2A,2B to cool the discharge water. (Or in the supply lines 2C,2D.) This effect may be particularly relevant for example in cold climates and/or in the winter season, where the availability of cold reservoir water and/or cold outside air for cooling purposes may be abundant.

In accordance with embodiments of the present invention, one can therefore achieve an improved fish farm and water supply systems to fish farms, in particular land-based farms. By providing a closed loop between the reservoir 3 and the intermediate storage 5,6 when exchanging water with the reservoir 3, the effect of any height difference between the reservoir 3 and the fish tanks 1*a-e* can be greatly reduced. The pumps 7,8 thus generally only need to overcome the friction and flow resistance in the pipes, and do not have to provide the energy to lift the water to a higher level, or, in certain embodiments, the pumps 7,8 are not required at all. Once the intermediate storage 5,6 has been filled, the water can be exchanged to the fish tanks 1*a-e*, also with substantially the only pumping energy required being that to overcome flow resistance in the pipes. This avoids the need to, for example, place fish tanks 1*a-e* partly below sea level in land-based fish farms which exchange water with the sea, as is conventionally done to avoid excessive energy usage. This requires significantly more construction work and thus higher capital expenditure to construct the fish farm, and significantly limits the available sites at which such fish farms can be constructed. According to embodiments presented here, the freedom to place such land-based fish farms at the most suitable location is greatly increased, while avoiding a penalty of increased energy usage for water circulation.

In some embodiments, it may be desirable to include sensors, sampling units and/or treatment systems in the fish farm. Advantageously, this can be implemented and connected to the intermediate storage 5,6 and/or the circulation conduit 9*a-d*. This allows direct access to, and control of, the supply water and/or the discharge water from the tanks 1*a-e*. For example, if the water from the tanks 1*a-e* does not have the appropriate quality for discharge to sea, it can be circulated through a treatment system coupled to e.g. the circulation conduit 9*a-d* before it is discharged via the discharge lines 2A,2B, or it can be routed to a separate tank or system for treatment or discharge. This can be done without the discharge fluid being in contact with the discharge lines 2A,2B, and one can thereby achieve a reduced risk of inadvertently discharging for example polluted water. A circulation of the water through a treatment system can also be done at the same height as the intermediate storage 5,6 and the circulation conduit 9*a-d*, thereby reducing energy usage.

Figure 5:
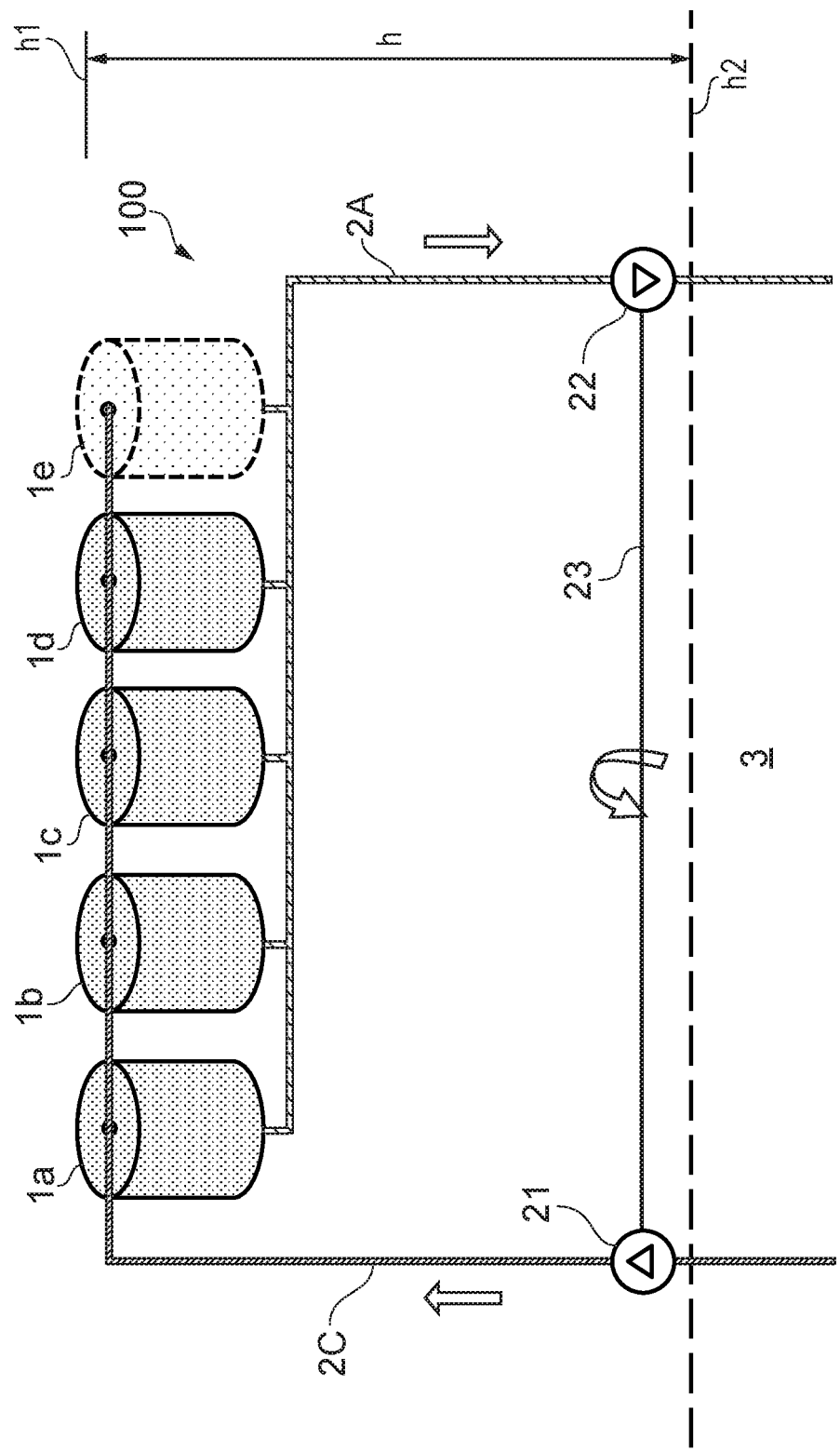
FIG. 5 is a schematic view of a fish farm according to another embodiment.

FIG. 5 illustrates another embodiment of a fish farm with at least one land-based fish tank 1*a-e* which is located at an elevated location compared to a reservoir 3, such as a seawater reservoir. The fish farm has a water supply system 100 comprising a supply line 2C and a discharge line 2A, the supply and discharge lines 2A,C being fluidly connected to a water reservoir 3 and to the fish tanks 1*a-e* for replenishing water in the fish tanks 1*a-e* similarly as described above. A pump 21 is arranged in the supply line 2C, the pump 21 being operable to pump water from the reservoir 3 to the fish tanks 1*a-e*. The pump 21 may be of any type, such as a rotodynamic pump, a piston pump, or any other suitable type. A water motor, in this embodiment a turbine 22, is arranged in the discharge line 2A. The water motor may alternatively be a piston machine or any other suitable type. The turbine 22 is configured to generate power from the water flow in the discharge line 2A. The power may be mechanical power, electrical power or hydraulic power. A coupling 23 connects the pump 21 and the turbine 22, whereby the turbine 22 can supply the power to the pump 21 via the coupling 23.

In FIG. 5, the coupling 23 is illustrated as a mechanical coupling, in this case a shaft, however the mechanical coupling may also be of a different form, for example a gear, chain, belt, or any other connection suitable for power transfer. Alternatively, the coupling may be an electrical coupling, whereby the turbine 22 generates electric power, for example via an electric generator coupled to a rotodynamic turbine wheel, and the electric coupling 23 transfers this energy to the pump 21. The pump 21 may itself be driven by an electric motor in such a case. Another alternative is for the coupling to be a hydraulic coupling, e.g. that the turbine 22 produces hydraulic energy which is supplied via the hydraulic coupling 23 to the pump 21.

In this embodiment, a reduction in energy usage of the fish farm can be achieved, in that part of the energy used to transfer the water from the reservoir 3 to the tanks 1a-e can be recovered in the turbine 22.

Figure 6:
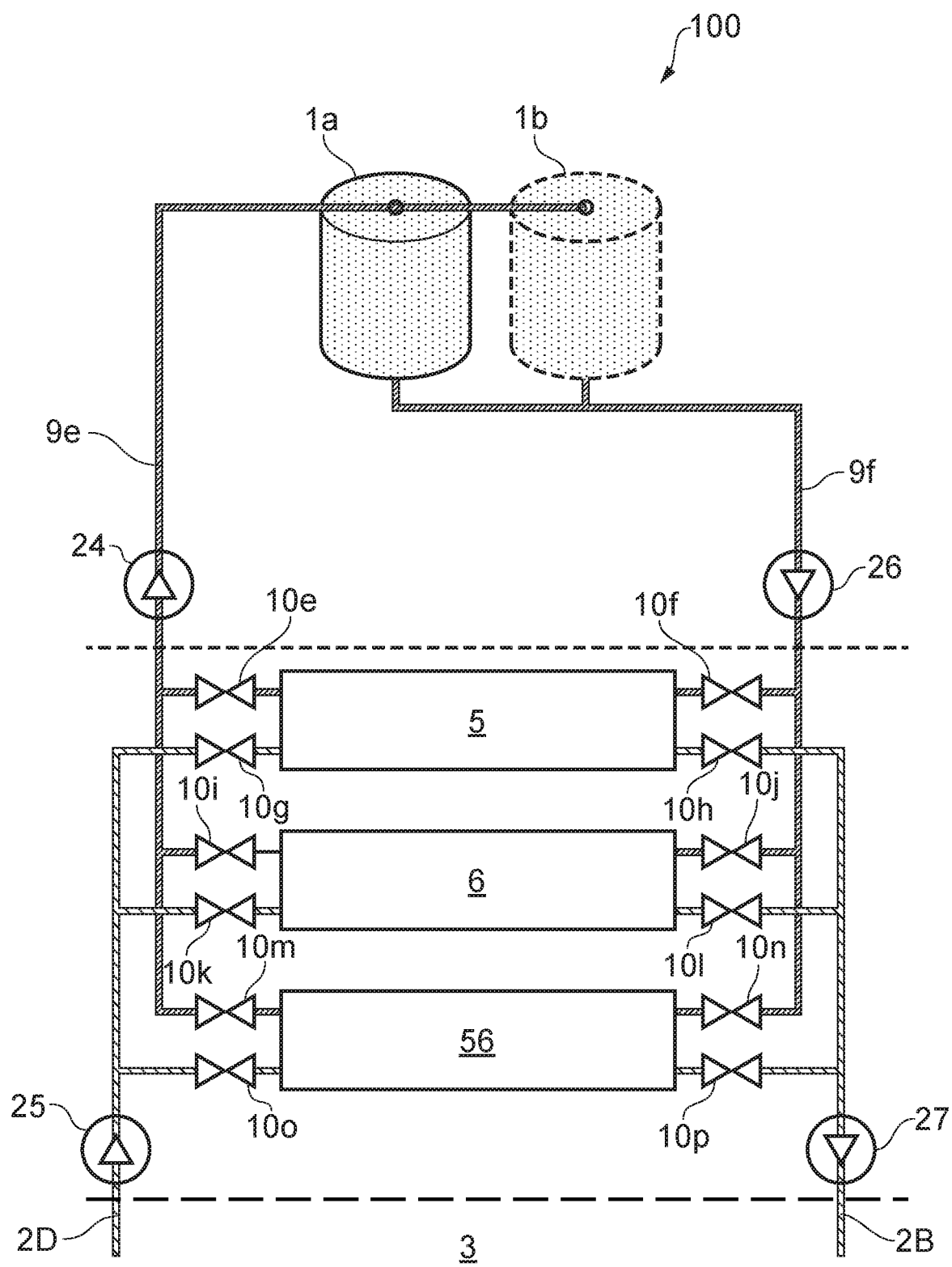
FIG. 6 is a schematic view of a fish farm according to another embodiment.

FIG. 6 illustrates another embodiment comprising three intermediate storage tanks 5, 6, 56. Each storage tank 5, 6, 56 has appropriate valves 10e-p so that each tank can be fluidly connected with the supply and discharge lines 2D, 2B, or with the circulation conduit 9e,f, which interconnects the tanks 5, 6, 56 with the fish tanks 1a,1b similarly as above.

In this embodiment, there are two pumps 24,26 arranged in the circulation conduit 9e,f, and two pumps 25,27 arranged in the supply and discharge lines 2D,2B. Optionally, one pump may suffice in the circulation conduit 9e,f and one in the supply or discharge lines 2D,2B, or alternatively, no pump may be necessary if natural flow can be obtained, based on e.g. density differences.

In the embodiment shown in FIG. 6, the valves 10e-p may be configured such that each of the tanks 5, 6, 56 is switched sequentially between circulation to the fish tanks 1a,b and to the reservoir 3, but phase shifted so that at least one of the tanks 5, 6, 56 at any one time is circulating to the fish tanks 1a,b, and at least one of the tanks 5, 6, 56 is circulating to the reservoir 3. This can be achieved for example by arranging the switching of the tanks 5, 6, 56 to operate with a 120 degree phase shift between them. This provides the advantage that continuous fluid flow can be obtained in the supply and discharge lines 2D, 2B, and in the circulation conduit 9e,f, since one "fluid circuit" will always be open and flowing. This may reduce the power consumption of the pumps 24-27, avoid pressure variations (e.g. pressure spikes due to valve action) in the system, and provide a more smooth fluid flow to the fish tanks 1a,b.

While the embodiment shown in FIG. 6 illustrates three tanks 5, 6, 56, other embodiments may comprise a higher number of tanks, such as four, five, six, or even more. These tanks may be switched in a rolling sequence, or for example in pairs, for example in an embodiment with six tanks, pairs of tanks may be switched together.

Figure 7:
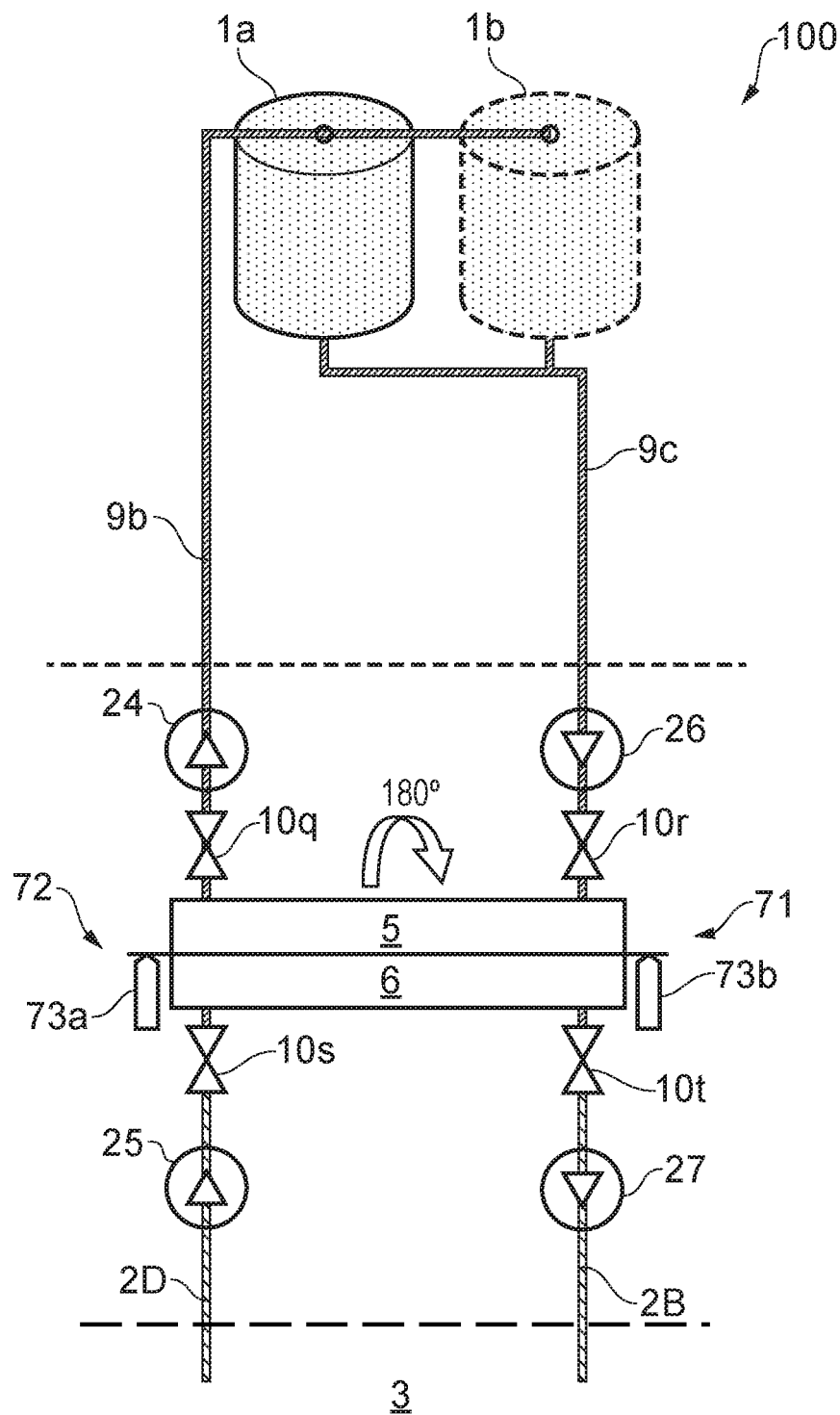
FIG. 7 is a schematic view of a fish farm according to another embodiment.

FIG. 7 illustrates another embodiment, wherein the first and second fluid tanks 5,6 are arranged in a common tank 71, the common tank 71 being rotatable and configured such that in a first rotational position, the first fluid container 5 is in fluid connection with the supply and discharge lines 2B,D and the second fluid container 6 is in fluid connection with the circulation conduit 9b,c, and in a second rotational position, the second fluid container 6 is in fluid connection with the supply and discharge lines 2B,D and the first fluid container 5 is in fluid connection with the circulation conduit 9a-f.

The tank 71 in this embodiment is cylindrical, and rotation of the tank 71 may, for example, be about a horizontal central axis 72 of the cylindrical tank body. The tank 71 may be supported by support elements 73a,b for this purpose. Switching between fluid connection to the reservoir 3 or to the fish tanks 1a,b can for example be arranged by means of sliding valves in or associated with the tank 71, such that the fluid tank 5,6 which at any one time faces the direction of the circulation conduit 9b,c is brought in fluid contact with this, and the fluid tank 5,6 which at any one time faces the supply and discharge lines 2B,D is brought in fluid contact with these.

Valves 10q-t may be provided to close the relevant fluid lines, however the valves may not be necessary for the operation of the system. Pumps 24-27 can be provided similarly as described above. The embodiment shown in FIG. 7 may optionally comprise further tanks operating in the same manner.

The invention is not limited by the embodiments described above; reference should be had to the appended claims.

The invention claimed is:

1. A fish farm having at least one land-based fish tank and a water supply system, the water supply system comprising:
a water reservoir;
at least one fish tank;
a supply valve arrangement;
a discharge valve arrangement;
a first supply line and a second supply line each having a first end and a second end, the first end in fluid connection with the water reservoir for drawing water from the water reservoir and the second end in fluid connection with the supply valve arrangement;
a first intermediate storage and a second intermediate storage each in fluid connection between the supply valve arrangement and the discharge valve arrangement, the first intermediate storage and the second intermediate storage each having a third end in fluid connection to the supply valve arrangement, and a fourth end in fluid connection to the discharge valve arrangement;
a first discharge line and a second discharge line each having a fifth end and a sixth end, the fifth end in fluid connection with the discharge valve arrangement and the sixth end in fluid connection with the water reservoir for discharging water into the water reservoir;
a first circulation conduit having a seventh end and an eighth end, wherein the seventh end is in fluid connection with the supply valve arrangement and the eighth end is configured in fluid connection with the at least one fish tank for supplying water to the at least one fish tank;
a second circulation conduit having a ninth and a tenth end, wherein the ninth end is configured in fluid connection with the at least one fish tank for discharging water from the at least one fish tank and the tenth end is in fluid connection with the discharge valve arrangement;
wherein the supply valve arrangement and the discharge valve arrangement are operable to, simultaneously, maintain a fluid connection between the first supply line, the first discharge line, and the first intermediate storage, and maintain a fluid connection between the first circulation conduit, the second circulation conduit, the at least one fish tank, and the second intermediate storage;
wherein in a first operational configuration the supply valve arrangement and the discharge valve arrangement are configured to permit circulation of fluid from the first intermediate storage through the second circulation conduit to the at least one fish tank, and from the at least one fish tank to the first intermediate storage via the first circulation conduit, wherein during the first operational configuration the supply valve arrangement and the discharge valve arrangement prevents fluid flow between the first intermediate storage and the water reservoir, and wherein during the first operational configuration the supply valve arrangement and the discharge valve arrangement are configured to permit circulation of fluid from the water reservoir via the second supply line through the second intermediate storage, and back to the water reservoir via the second discharge line and prevents fluid communication between the second intermediate storage and the at least one fish tank;

wherein in a second operational configuration the supply valve arrangement and the discharge valve arrangement are configured to permit circulation of fluid from the water reservoir via the first supply line, through the first intermediate storage, and back to the water reservoir via the first discharge line, and prevents fluid communication between the first intermediate storage and the at least one fish tank, and wherein during the second operational configuration the supply valve arrangement and the discharge valve arrangement are configured to permit circulation of fluid from the second intermediate storage through the second circulation conduit to the at least one fish tank, and from the at least one fish tank to the second intermediate storage via the first circulation conduit and prevents fluid flow between the second intermediate storage and the water reservoir; and wherein the first operational configuration and the second operational configuration are configured to achieve a near-continuous operation and circulation of the at least one fish tank.

2. The fish farm of claim 1, comprising at least one pump operable to flow water between the first intermediate storage and the first circulation conduit, and/or from the first supply line, via the first intermediate storage, to the first discharge line.

3. The fish farm of claim 2, wherein the at least one pump comprises a pump located in the first intermediate storage.

4. The fish farm of claim 2, wherein the at least one pump comprises a first pump arranged in the first supply line or the first discharge line and a second pump arranged in the first circulation conduit.

5. The fish farm of claim 1, wherein the water reservoir is located:
   lower than an upper water surface in the at least one fish tank, or
   lower than the at least one fish tank.

6. The fish farm of claim 1, wherein the water reservoir comprises a common supply and discharge reservoir, and wherein the common supply and discharge reservoir is a sea.

7. The fish farm of claim 1, wherein the water reservoir comprises separate supply and discharge reservoirs.

8. The fish farm of claim 1, wherein the first intermediate storage is arranged:
   at a height which is at the same height as the at least one fish tank.

9. The fish farm of claim 1, wherein the supply valve arrangement and the discharge valve arrangement are operable to independently control the first intermediate storage to be:
   in fluid connection with the first supply line and the first discharge line, or
   in fluid connection with the first circulation conduit and the second circulation conduit.

10. The fish farm of claim 1, wherein the first intermediate storage is arranged at a height which is lower than the at least one fish tank.

11. The fish farm of claim 1, wherein the first intermediate storage is arranged at a height which is between the at least one fish tank and the water reservoir.

12. A method of operating a fish farm having at least one land-based fish tank, the method comprising:
   (i) bringing a fluid container into fluid communication with a water reservoir and circulating water from the water reservoir, through the fluid container and to the water reservoir, and simultaneously preventing fluid communication between the fluid container and the at least one land-based fish tank;
   (ii) bringing the fluid container into fluid communication with the at least one land-based fish tank and circulating water in a loop between the fluid container and the at least one land-based fish tank and simultaneously preventing fluid communication between the fluid container and the water reservoir,
   wherein steps (i) and (ii) are carried out as separate, sequential steps;
   (iii) bringing a second fluid container into fluid communication with the water reservoir and circulating water from the water reservoir, through the second fluid container and to the water reservoir, while simultaneously preventing fluid flow between the second fluid container and the at least one land-based fish tank, and
   (iv) bringing the second fluid container into fluid communication with the at least one land-based fish tank and circulating water between the second fluid container and the at least one land-based fish tank, while simultaneously preventing fluid communication between the second fluid container and the water reservoir, wherein steps (iii) and (iv) are carried out as separate, sequential steps, and wherein steps (i) and (iv) are carried out simultaneously and steps (ii) and (iii) are carried out simultaneously to achieve a near-continuous operation and circulation of the at least one fish tank.

13. The method of claim 12, wherein the water reservoir is located:
   lower than an upper water surface in the at least one land-based fish tank, or
   lower than the at least one land-based fish tank.

14. The method of claim 12, wherein the step of circulating water from the water reservoir, through the fluid container and to the water reservoir is carried out by:
   a first pump arranged in the fluid container,
   a second pump arranged in a supply line or a discharge line fluidly connecting the fluid container with the water reservoir, or
   natural flow caused by temperature and density differences in the water.

15. The method of claim 12, wherein the step of circulating water between the fluid container and the at least one land-based fish tank is carried out by:
   a first pump arranged in the fluid container,
   a second pump arranged in a circulation conduit fluidly connecting the fluid container with the at least one land-based fish tank, or
   natural flow caused by temperature and density differences in the water.

16. The method of claim 12, wherein the separate, sequential steps (i) and (ii) are controlled by a valve arrangement fluidly connected to the fluid container, the water reservoir and the at least one land-based fish tank, the valve arrangement having:
   a first operational configuration in which the valve arrangement permits circulation of fluid between the fluid container and the at least one land-based fish tank, and
   a second operational configuration in which the valve arrangement permits circulation of fluid between the fluid container and the water reservoir.

17. A fish tank water supply system comprising:
   a reservoir;
   a fish tank;
   a first intermediate storage;
   a second intermediate storage;

a supply valve configuration;

a discharge valve configuration, wherein the fish tank, the first intermediate storage, and the second intermediate storage are connected in parallel between the supply valve configuration and the discharge valve configuration, wherein the supply valve configuration receives fluid from the reservoir and wherein the discharge valve configuration discharges fluid to the reservoir;

wherein by operation of the supply valve configuration and the discharge valve configuration, in a first mode, the first intermediate storage is placed in a first closed loop with the fish tank, the first intermediate storage and the fish tank are isolated from the reservoir, and the second intermediate storage is in fluid communication with the reservoir, and in a second mode, the reservoir is in fluid communication with the first intermediate storage, the reservoir and the first intermediate storage are isolated from the fish tank, and the second intermediate storage is in a second closed loop with the fish tank, and wherein the first mode and the second mode are configured to achieve a near-continuous operation and circulation of the fish tank.

\* \* \* \* \*